United States Patent
Huang

(10) Patent No.: US 9,442,588 B2
(45) Date of Patent: Sep. 13, 2016

(54) TOUCH PANEL

(71) Applicant: E Ink Holdings Inc., Hsinchu (TW)

(72) Inventor: Ching-Hung Huang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 155 days.

(21) Appl. No.: 14/161,710

(22) Filed: Jan. 23, 2014

(65) Prior Publication Data
US 2014/0313437 A1    Oct. 23, 2014

(30) Foreign Application Priority Data

Apr. 17, 2013 (TW) ............... 102113620 A

(51) Int. Cl.
G06F 3/041    (2006.01)
G06F 3/044    (2006.01)

(52) U.S. Cl.
CPC ............. *G06F 3/041* (2013.01); *G06F 3/044* (2013.01); *G06F 2203/04111* (2013.01)

(58) Field of Classification Search
CPC .................. G06F 3/041; G06F 3/044; G06F 2203/04111
USPC .................................................. 345/173–176
See application file for complete search history.

(56) References Cited

U.S. PATENT DOCUMENTS

| | | | |
|---|---|---|---|
| 5,680,192 A | 10/1997 | Burrell et al. | |
| 6,188,391 B1 * | 2/2001 | Seely | G06F 3/044 178/18.03 |
| 7,151,532 B2 * | 12/2006 | Schulz | C03C 17/3417 345/173 |
| 7,307,624 B2 * | 12/2007 | Geaghan | G06F 3/044 345/156 |
| 7,358,955 B2 | 4/2008 | Lim | |
| 7,633,591 B2 | 12/2009 | Kim | |
| 8,125,605 B2 | 2/2012 | Jeoung et al. | |
| 8,199,088 B2 | 6/2012 | You et al. | |
| 9,128,568 B2 * | 9/2015 | Long | B32B 17/10036 |
| 2002/0109658 A1 | 8/2002 | Noguchi | |

(Continued)

FOREIGN PATENT DOCUMENTS

CN    101719038    6/2010
CN    202533920    11/2012

(Continued)

OTHER PUBLICATIONS

"Office Action of Taiwan Counterpart Application", issued on Nov. 14, 2014, p. 1-p. 6.

(Continued)

*Primary Examiner* — Grant Sitta
(74) *Attorney, Agent, or Firm* — Jianq Chyun IP Office

(57) ABSTRACT

A touch panel includes a substrate, first sensing series, second sensing series interlaced with the first sensing series, first conductive lines, and second conductive lines. The substrate has an active region and a peripheral circuit region located outside the active region. The first sensing series and the second sensing series are located at the active region. No conductive line electrically connected to the second sensing series is configured between any of two ends of each of the second sensing series and a portion of an edge of the substrate adjacent to the end. The first conductive lines are located at the peripheral circuit region and electrically connected to the first sensing series. The second conductive lines are electrically connected to the second sensing series. The second conductive lines are extended from the inside of the active region to the peripheral circuit region.

15 Claims, 18 Drawing Sheets

(56) References Cited

U.S. PATENT DOCUMENTS

| | | | | |
|---|---|---|---|---|
| 2007/0002204 A1* | 1/2007 | Kim | G02F 1/1345 | 349/54 |
| 2007/0008299 A1* | 1/2007 | Hristov | G06F 3/0416 | 345/173 |
| 2007/0257894 A1* | 11/2007 | Philipp | G06F 3/044 | 345/173 |
| 2008/0007534 A1* | 1/2008 | Peng | G06F 3/044 | 345/173 |
| 2009/0262096 A1* | 10/2009 | Teramoto | G06F 3/0412 | 345/174 |
| 2009/0277695 A1* | 11/2009 | Liu | G06F 3/044 | 178/18.03 |
| 2010/0019998 A1* | 1/2010 | You | G02F 1/133707 | 345/87 |
| 2010/0045625 A1* | 2/2010 | Yang | G06F 3/044 | 345/173 |
| 2010/0073319 A1* | 3/2010 | Lyon | G06F 3/044 | 345/174 |
| 2010/0085326 A1* | 4/2010 | Anno | G06F 3/044 | 345/174 |
| 2010/0123674 A1* | 5/2010 | Wu | G06F 3/044 | 345/173 |
| 2010/0182275 A1* | 7/2010 | Saitou | G06F 3/044 | 345/174 |
| 2010/0182530 A1* | 7/2010 | Fujikawa | G02F 1/1339 | 349/58 |
| 2010/0302178 A1* | 12/2010 | Liu | G06F 3/041 | 345/173 |
| 2011/0057892 A1* | 3/2011 | Kwak | G06F 3/0412 | 345/173 |
| 2011/0074705 A1* | 3/2011 | Yousefpor | G06F 3/041 | 345/173 |
| 2011/0141037 A1* | 6/2011 | Hwang | G06F 3/044 | 345/173 |
| 2011/0199341 A1* | 8/2011 | Reinfried | G06F 3/044 | 345/176 |
| 2011/0273655 A1 | 11/2011 | Lin et al. | | |

FOREIGN PATENT DOCUMENTS

| | | |
|---|---|---|
| CN | 202694311 | 1/2013 |
| TW | M428420 | 5/2012 |
| TW | 201224886 | 6/2012 |
| TW | 201234249 | 8/2012 |
| TW | M459451 | 8/2013 |

OTHER PUBLICATIONS

"Office Action of China Counterpart Application", issued on Jul. 20, 2016, p1-p10, in which the listed references were cited.

* cited by examiner

TOUCH PANEL

CROSS-REFERENCE TO RELATED APPLICATION

This application claims the priority benefit of Taiwan application serial no. 102113620, filed on Apr. 17, 2013. The entirety of the above-mentioned patent application is hereby incorporated by reference herein and made a part of this specification.

BACKGROUND OF THE INVENTION

1. Field of the Invention

The invention relates to a touch panel; more particularly, the invention relates to a touch panel having less frame area.

2. Description of Related Art

With the blooming development of the electronic technology and the prevalence of wireless communication and the internet, various electronic devices are becoming indispensable in people's day-to-day lives. However, it is not easy to operate the most common input-output (I/O) interfaces, such as keyboards or mice, and compared to the keyboards and the mice, touch panels are direct and simple I/O interfaces. Therefore, the touch panels are often applied as communication control interfaces between human beings and electronic devices.

At present, the touch panels not only tend to become highly sensitive and precise but also have to comply with consumers' requirements for aesthetic appearance of electronic products; accordingly, the conventional touch panels with large frame area can no longer satisfy the consumers' needs. In most cases, conductive lines that are located at respective sides of sensing series of touch panels are required for electrically connecting the sensing series to bonding pads below the sensing series; therefore, the touch panels having less frame area can barely be reduced to practice.

SUMMARY OF THE INVENTION

The invention is directed to a touch panel characterized by less frame area.

In an embodiment of the invention, a touch panel that includes a substrate, a plurality of first sensing series, a plurality of second sensing series, a plurality of first conductive lines, and a plurality of second conductive lines is provided. The substrate has an active region and a peripheral circuit region located outside the active region. The first sensing series are located at the active region of the substrate. No conductive line electrically connected to the first sensing series is configured between one end of each of the first sensing series and one portion of an edge of the substrate adjacent to the one end. The second sensing series are located at the active region of the substrate and interlaced with the first sensing series. Each of the second sensing series has two opposite ends. No conductive line electrically connected to the second sensing series is configured between any of the two ends of each of the second sensing series and the other portion of the edge of the substrate adjacent to the any of the two ends. The first conductive lines are located at the peripheral circuit region of the substrate and electrically connected to the first sensing series, respectively. The second conductive lines are located on the substrate and electrically connected to the second sensing series, respectively. The second conductive lines are extended from the inside of the active region to the peripheral circuit region.

According to an embodiment of the invention, at least parts of the second conductive lines and parts of the second sensing series are overlapped in a direction perpendicular to the substrate.

According to an embodiment of the invention, the touch panel further includes an insulation layer. The insulation layer is located between the second sensing series and the second conductive lines. Besides, the insulation layer has a plurality of first contact windows, and the second sensing series are electrically connected to the second conductive lines through the first contact windows.

According to an embodiment of the invention, the second conductive lines are located between the insulation layer and the substrate.

According to an embodiment of the invention, the second sensing series are located between the insulation layer and the substrate.

According to an embodiment of the invention, the touch panel further includes a plurality of conductive patterns. The first conductive windows of the insulation layer are filled with the conductive patterns, and the conductive patterns are electrically connected to the second conductive lines. The second sensing series respectively cover the conductive patterns and are electrically connected to the second conductive lines.

According to an embodiment of the invention, each of the first sensing series includes a plurality of first sensing pads and a plurality of first bridge patterns serially connected to the first sensing pads, and the conductive patterns and the first bridge patterns are located at the same film layer.

According to an embodiment of the invention, the first contact windows of the insulation layer are respectively filled with the second sensing series, and the second sensing series are electrically connected to the second conductive lines.

According to an embodiment of the present invention, the touch panel further includes a plurality of first bonding pads and a plurality of second bonding pads. The first bonding pads are located at the peripheral circuit region of the substrate and electrically connected to the first conductive lines, respectively. The second bonding pads are located at the peripheral circuit region of the substrate and electrically connected to the second conductive lines, respectively. The first bonding pads and the second bonding pads are located at the same film layer.

According to an embodiment of the invention, the touch panel further includes an insulation layer. The insulation layer is located between the second bonding pads and the second conductive lines. The insulation layer has a plurality of second contact windows respectively exposing the second conductive lines. The second contact windows are filled with the second bonding pads, and the second bonding pads are electrically connected to the second conductive lines.

According to an embodiment of the invention, the second conductive lines are divided into two groups of the second conductive lines. One of the two groups of the second conductive lines is concentrated at one side of the substrate; the other group of the second conductive lines is concentrated at the other side of the substrate opposite to the one side of the substrate.

According to an embodiment of the invention, the second sensing series are arranged along a direction from the active region to the peripheral circuit region. The second sensing series located in odd rows are electrically connected to one of the two groups of the second conductive lines. The second sensing series located in even rows are electrically connected to the other group of the second conductive lines.

According to an embodiment of the invention, a thickness of the insulation layer is less than or substantially equal to 1.5 µm.

According to an embodiment of the invention, the second conductive lines are transparent.

According to an embodiment of the invention, the same end of each of the first sensing series is aligned to the one portion of the edge of the substrate adjacent to said end. Any of the two ends of each of the second sensing series is aligned to the other portion of the edge of the substrate adjacent to the any of the two ends.

In view of the above, the input or output ends of the second sensing series and the input or output ends of the first sensing series in the touch panel described in an embodiment of the invention are pulled to the same side, so as to reduce the frame area of the touch panel.

Several exemplary embodiments accompanied with figures are described in detail below to further describe the invention in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DETAILED DESCRIPTION OF DISCLOSED EMBODIMENTS

First Embodiment

Figure 1:
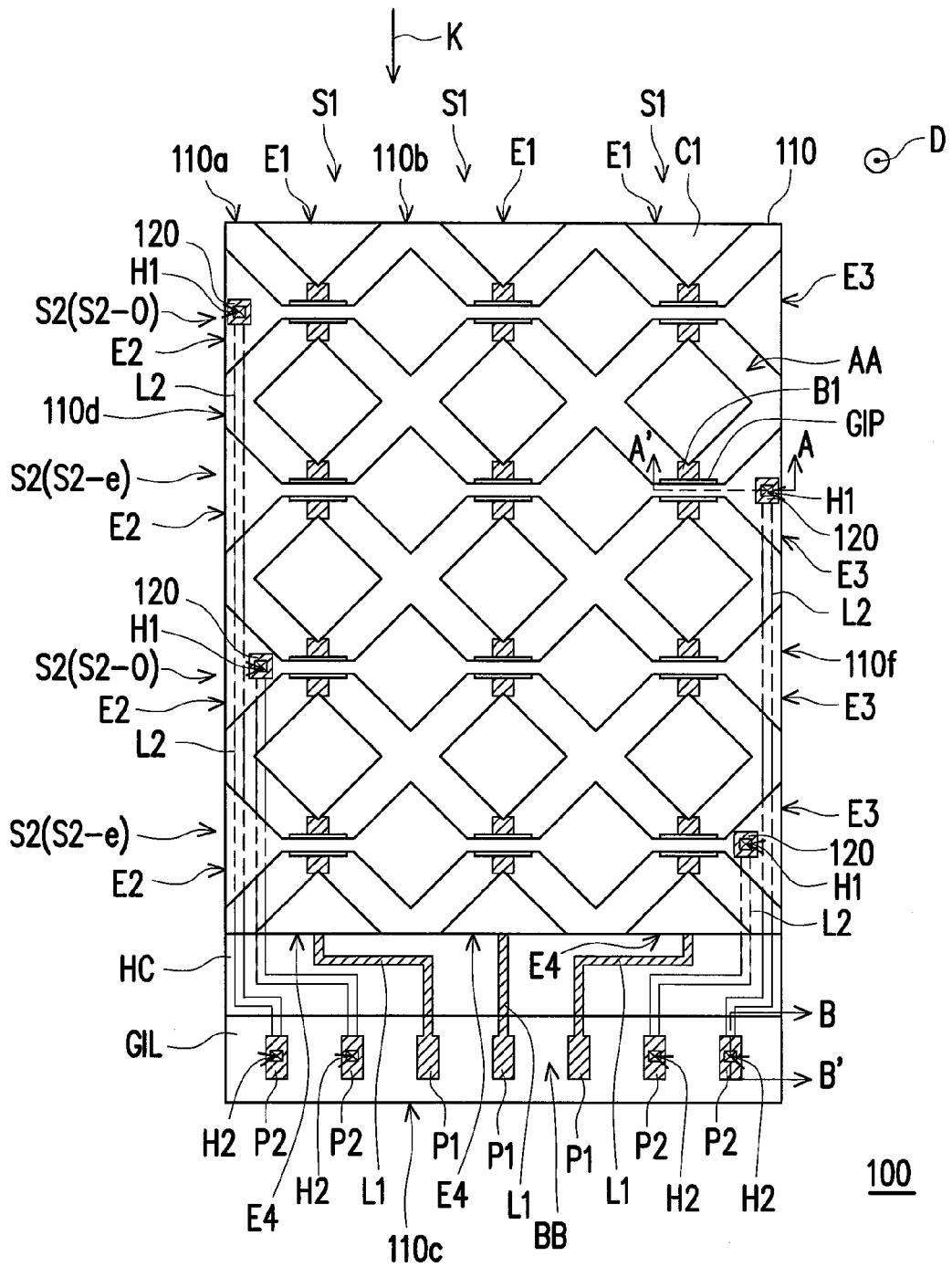
FIG. 1 is a schematic top view of a touch panel according to a first embodiment of the invention.
Figure 2:
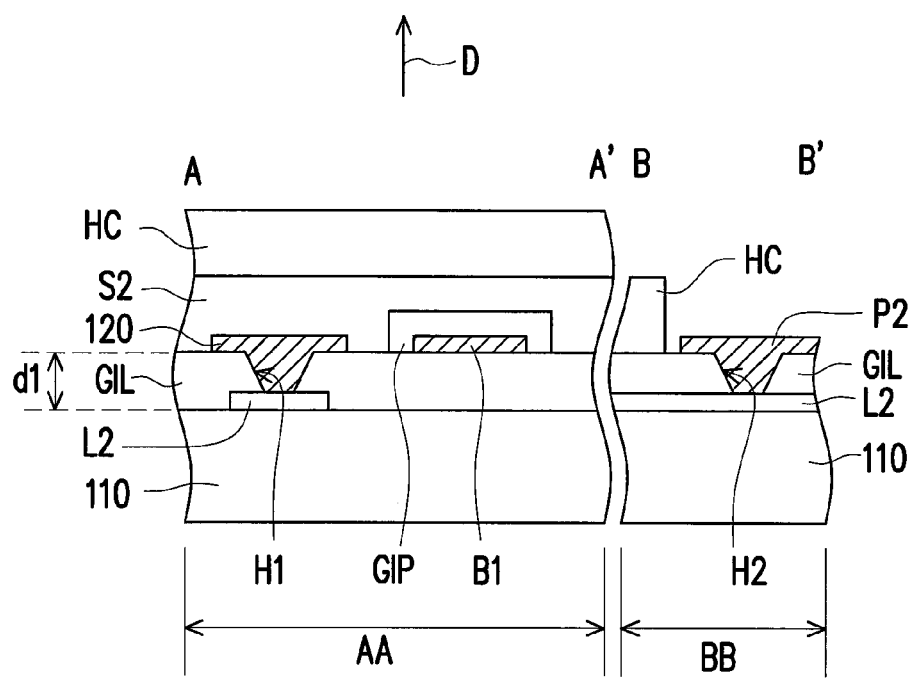
FIG. 2 is a schematic cross-sectional view illustrating the touch panel shown in FIG. 1 along sectional lines A-A' and B-B'.

FIG. 1 is a schematic top view of a touch panel according to a first embodiment of the invention. FIG. 2 is a schematic cross-sectional view illustrating the touch panel shown in FIG. 1 along sectional lines A-A' and B-B'. With reference to FIG. 1 and FIG. 2, the touch panel 100 described in the present embodiment includes a substrate 110, a plurality of first sensing series S1, a plurality of second sensing series S2, a plurality of first conductive lines L1, and a plurality of second conductive lines L2. The substrate 110 has an active region AA and a peripheral circuit region BB located outside the active region AA. The first sensing series S1 and the second sensing series S2 are located at the active region AA of the substrate 110.

As shown in FIG. 1, no conductive line electrically connected to the first sensing series S1 is configured between one end E1 of each of the first sensing series S1 and one portion 110b of an edge 110a of the substrate 110 adjacent to the end E1. To be specific, in the present embodiment of the invention, the same ends E1 of the first sensing series S1 are aligned to the portion 110b of the edge 110a of the substrate 100 adjacent to said ends E1. The second sensing series S2 are interlaced with the first sensing series S1. No conductive line electrically connected to the second sensing series S2 is configured between any of the two opposite ends E2 and E3 of each of the second sensing series S2 and the other portion 110d (or 110f) of the edge 110a of the substrate 110 adjacent to the end E2 or the end E3. To be specific, in the present embodiment of the invention, any of the two opposite ends E2 and E3 of each of the second sensing series S2 may be aligned to the other portion 110d of the edge 110a of the substrate 110. Here, the end E2 is aligned to the portion 110d of the edge 110a of the substrate 110, and the end E3 is aligned to the portion 110f of the edge 110a of the substrate 110. The two ends E2 and E3 refer to the two ends of each of the second sensing series S2 in an extension direction of the second sensing series S2. In light of the foregoing, three sides of the touch panel 100 described herein may be frameless. In order to reduce the touch panel 100 (three sides of which are frameless) to practice, the second conductive lines L2 electrically connected to the second sensing series S2 require special arrangement, which will be elaborated below with reference to drawings.

As illustrated in FIG. 1, the first conductive lines L1 are located at the peripheral circuit region BB of the substrate 110 and electrically connected to the first sensing series S1, respectively. Particularly, each of the first sensing series S1 has two opposite ends E1 and E4. The two ends E1 and E4 refer to the two ends of each of the first sensing series S1 in an extension direction of the first sensing series S1. In the present embodiment, the first conductive lines L1 are in contact with the ends E4 of the first sensing series S1 and are thus electrically connected to the first sensing series S1. The second conductive lines L2 are located on the substrate 110 and electrically connected to the second sensing series S2, respectively. Note that the second conductive lines L2 are extended from the inside of the active region AA to the peripheral circuit region BB. In particular, each second conductive line L2 is extended to the peripheral circuit region BB (where the first conductive lines L1 are located) from the junction (e.g., the contact window H1) of the second conductive line L2 and the second sensing series S2 electrically connected thereto. The extension direction of the second conductive lines L2 is different form the extension direction of the second sensing series S2. Specifically, in the present embodiment, the extension direction of the second conductive lines L2 in the active region AA is substantially the same as the extension direction of the first sensing series S1. Besides, the second conductive lines L2 have to be extended from the inside of the active region AA to the peripheral circuit region BB, and thus at least parts of the second conductive lines L2 have to cross parts of the second sensing series S2. That is, at least parts of the second conductive lines L2 and parts of the second sensing series S2 are overlapped in a direction D perpendicular to the substrate 110.

When the second conductive lines L2 are extended from the inside of the active region AA to the peripheral circuit region BB, in order for the second conductive lines L2 not to be electrically connected to the non-corresponding second sensing series S2 and the non-corresponding first sensing series S1, the second conductive lines L2 and the first and second sensing series S1 and S2 may be configured in different film layers. To be specific, the touch panel 100 described in the present embodiment further includes an insulation layer GIL. As shown in FIG. 2, the insulation layer GIL is located between the second sensing series S2 and the second conductive lines L2. In the present embodiment, the second conductive lines L2 may be located between the insulation layer GIL and the substrate 110. Namely, the second conductive lines L2 may be located in a film layer below the first sensing series S1 and the second sensing series S2; however, the invention is not limited thereto, and the second conductive lines L2 may also be located in a film layer above the first sensing series S1 and the second sensing series S2, which will be exemplified in the second embodiment.

As shown in FIG. 1 and FIG. 2, the insulation layer GIL described in the present embodiment has a plurality of first contact windows H1, and the second sensing series S2 are electrically connected to the second conductive lines L2 through the first contact windows H1. Particularly, the touch panel 100 described in the present embodiment further includes a plurality of conductive patterns 120. The first conductive windows H1 of the insulation layer GIL are filled with the conductive patterns 120, and the conductive patterns 120 are thus in contact with the second conductive lines L2 and then electrically connected to the second conductive lines L2. The second sensing series S2 respectively cover the conductive patterns 120 and are electrically connected to the second conductive lines L2 through the conductive patterns 120. When the bridge patterns B1 of the first sensing series S1 are formed through etching, it should be mentioned that the conductive patterns 120 are able to prevent etchant from permeating into the second conductive lines L2 through the first contact windows H1 and impairing the second conductive lines L2. However, the invention is not limited to the above descriptions; in another embodiment of the invention, it is also likely not to form the conductive patterns 120. The following explanations are provided with reference to FIG. 3 and FIG. 4.

Figure 3:
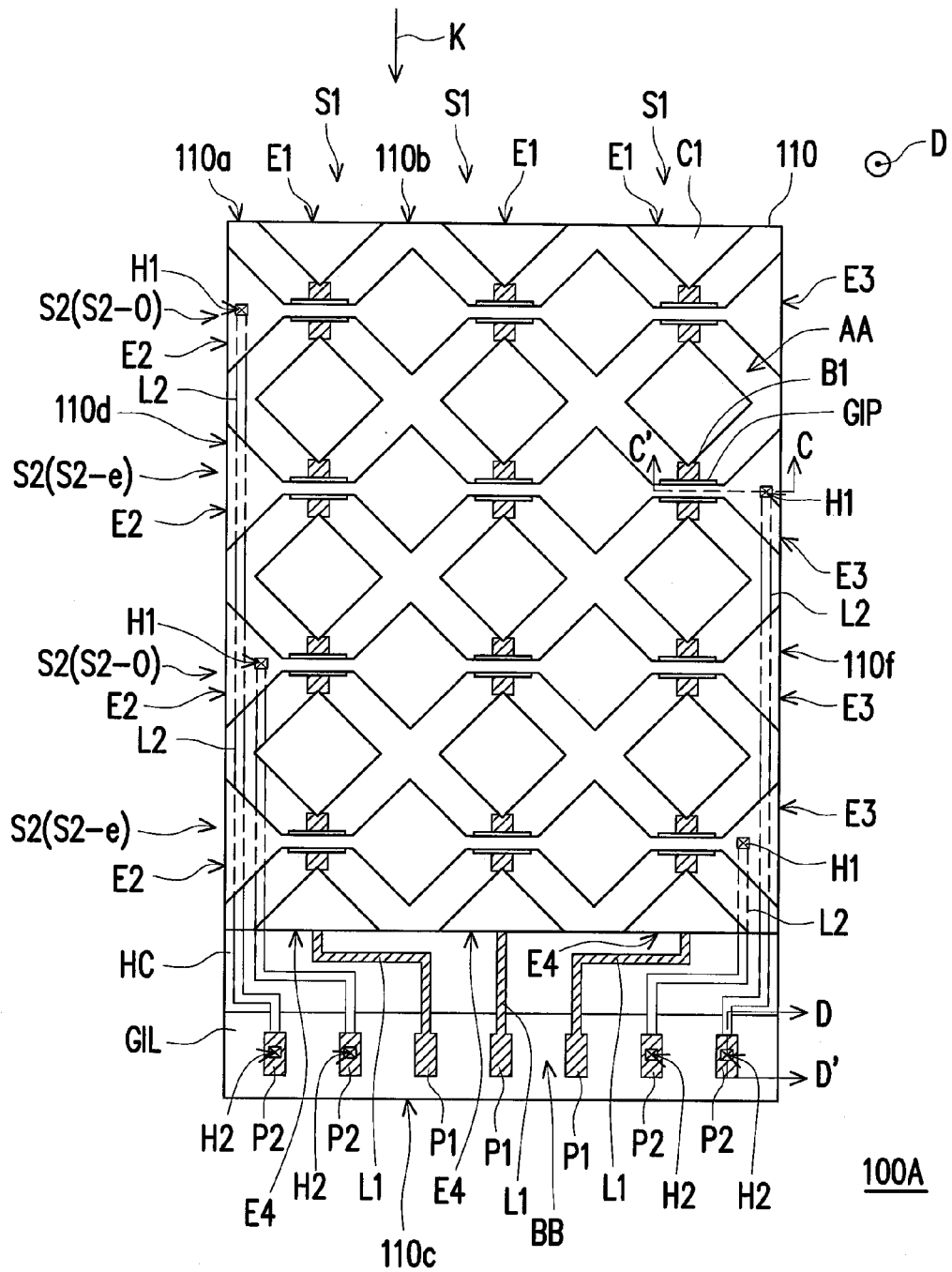
FIG. 3 is a schematic top view of a touch panel according to another embodiment of the invention.
Figure 4:
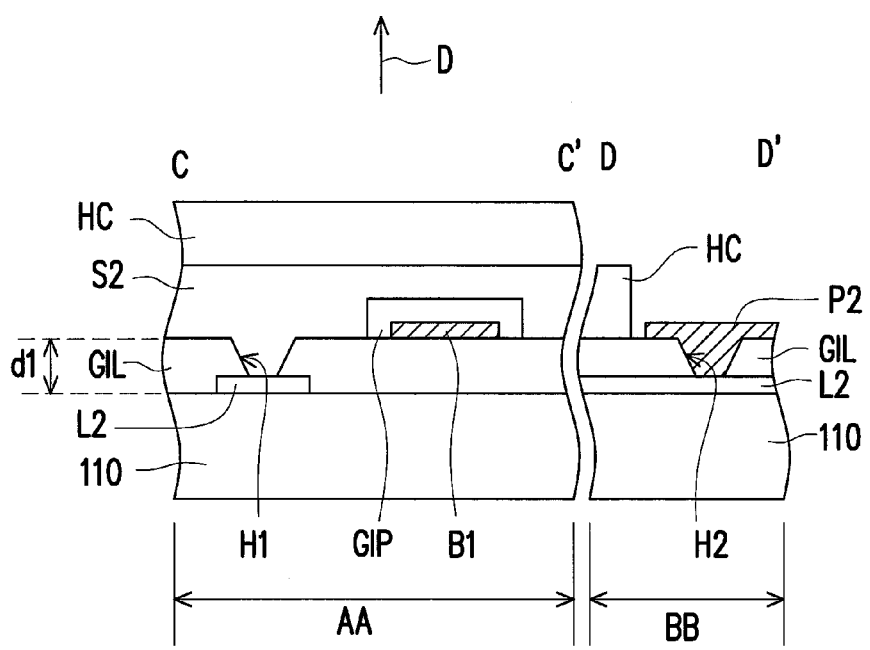
FIG. 4 is a schematic cross-sectional view illustrating the touch panel shown in FIG. 3 along sectional lines C-C' and D-D'.

FIG. 3 is a schematic top view of a touch panel according to another embodiment of the invention. FIG. 4 is a schematic cross-sectional view illustrating the touch panel shown in FIG. 3 along sectional lines C-C' and D-D'. With reference to FIG. 3 and FIG. 4, the touch panel 100A depicted in FIG. 3 and FIG. 4 is similar to the touch panel 100 depicted in FIG. 1 and FIG. 2, while the difference therebetween lies in that the touch panel 100A may not include the conductive patterns 120. Hence, the same components of the touch panels 100A and 100 are represented by the same reference numbers, and the relations of each component of the touch panel 100A may be referred to as those of the touch panel 100 and will not be further described hereinafter. The touch panel 100A does not include the conductive patterns 120. In the touch panel 100A, the first conductive windows H1 of the insulation layer GIL are directly filled with the second sensing series S2, and the second sensing series S2 are thus in contact with the second conductive lines L2 and then electrically connected to the second conductive lines L2.

With reference to FIG. 2, the thickness d1 of the insulation layer GIL described herein may be properly designed, so as to reduce the influence of the second conductive lines L2 on the electrical properties of the touch panel 100. In FIG. 1 and FIG. 2, the thickness d1 of the insulation layer GIL may be less than or substantially equal to 1.5 µm, for instance. When the thickness d1 of the insulation layer GIL is properly designed, the capacitance between the second conductive lines L2 and the first sensing series S1 is small, and thereby the second conductive lines L2 are not apt to pose an impact on the electrical properties of the touch panel 100. Additionally, in the present embodiment, the second conductive lines L2 may be made of a transparent conductive material (e.g., indium tin oxide, ITO), such that the second conductive lines L2 do not negatively affect the visual effects of the touch panel 100. However, the invention is not limited thereto, and the second conductive lines L2 in other embodiments of the invention may be made of an opaque conductive material, such as metal, alloy, and so forth. At this time, to prevent the second conductive lines L2 from negatively affecting the visual effects of the touch panel 100, the designed width of the second conductive lines L2 may be invisible to the naked eyes of human beings.

According to the present embodiment, the touch panel 100 further includes a plurality of first bonding pads P1 and a plurality of second bonding pads P2. The first bonding pads P1 are located at the peripheral circuit region BB of the substrate 110 and electrically connected to the first conductive lines L1, respectively. The second bonding pads P2 are located at the peripheral circuit region BB of the substrate 110 as well and electrically connected to the second conductive lines L2, respectively. To enable the touch panel 100 to be bonded to other electronic components (e.g., driving chips, etc.), the first bonding pads P1 and the second bonding pads P2 may be located at the same film layer. In this case, the first bonding pads P1 and the second bonding pads P2 are almost located on the same plane, such that the first bonding pads P1 and the second bonding pads P2 are prone to be well bonded to other electronic components at the same time.

Particularly, the insulation layer GIL described herein is located between the second bonding pads P2 and the second conductive lines L2. The insulation layer GIL has a plurality of second contact windows H2 respectively exposing the second conductive lines L2. The first bonding pads P1 and the second bonding pads P2 may be located above the insulation layer GIL. Here, the second contact windows H2 are filled with the second bonding pads P2, and the second bonding pads P2 are thus in contact with and electrically connected to the second conductive lines L2. Each of the first sensing series includes a plurality of first sensing pads C1 and a plurality of first bridge patterns B1 serially connected to the first sensing pads C1. The first bonding pads P1, the second bonding pads P2, and the first bridge patterns B1 may be located at the same film layer.

In the present embodiment, the second conductive lines L2 are divided into two groups of the second conductive lines. One group of the second conductive lines L2 is concentrated at one side of the substrate 110 (e.g., the left side of the substrate 110 as shown in FIG. 1), and the other group of the second conductive lines L2 is concentrated at the other side of the substrate 110 (e.g., the right side of the substrate 110 as shown in FIG. 1) opposite to the one side of the substrate 110. The second sensing series S2 are arranged along a direction K from the active region AA to the peripheral circuit region BB. The second sensing series S2-o located in odd rows are electrically connected to one of the two groups of the second conductive lines L2 (e.g., the group of second conductive lines L2 located at the left side of the substrate 110), and the second sensing series S2-e located in even rows are electrically connected to the other group of the second conductive lines L2 (e.g., the group of second conductive lines L2 located at the right side of the substrate 110). When the second conductive lines L2 are arranged in the above-mentioned manner, the touch panel 100 is apt to be driven, and thereby the electrical properties of the touch panel 100 may be satisfactory.

Figure 5A:
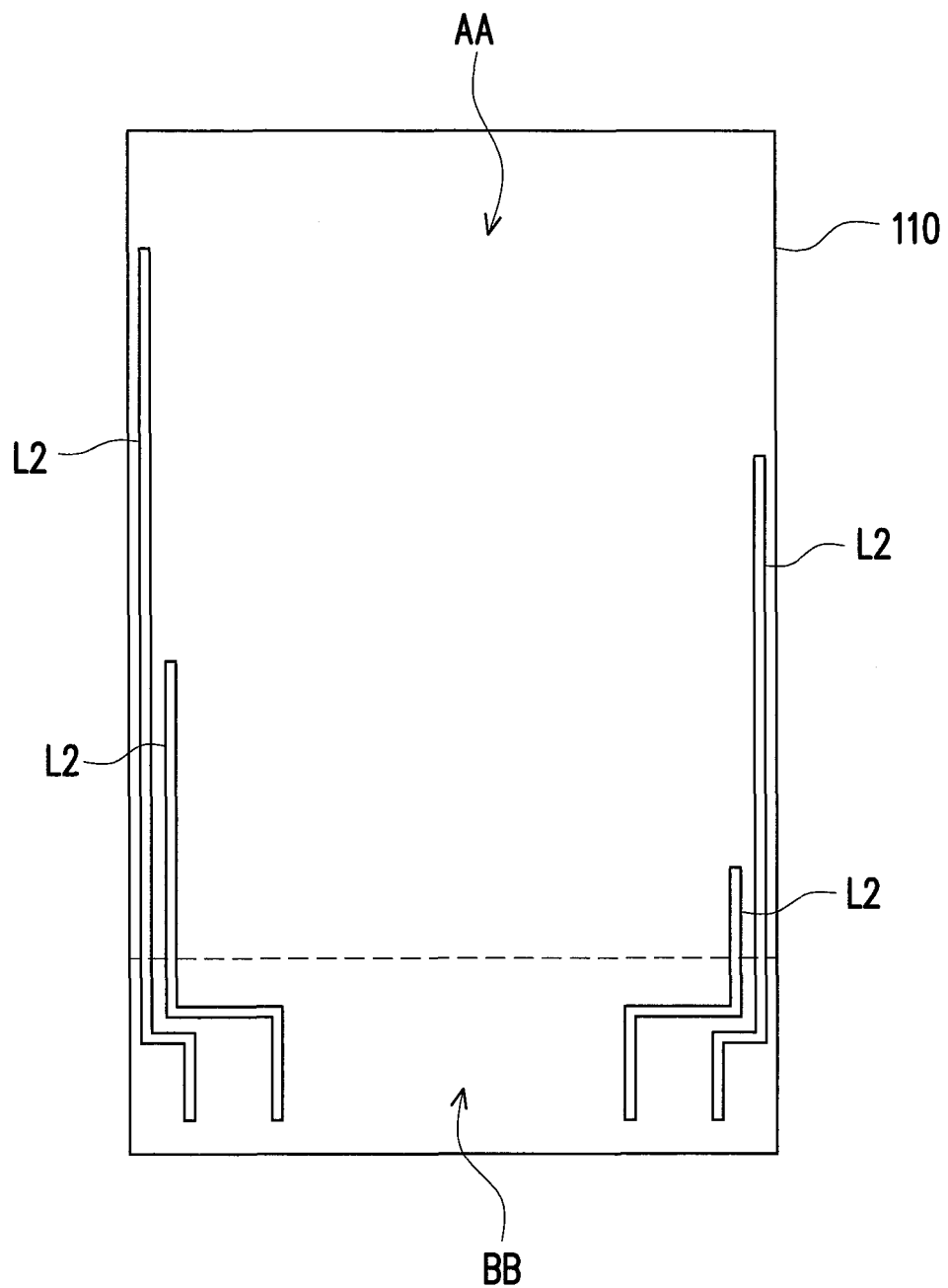
FIG. 5A to FIG. 5F are top views of film layers in the touch panel depicted in FIG. 1.
Figure 5B:
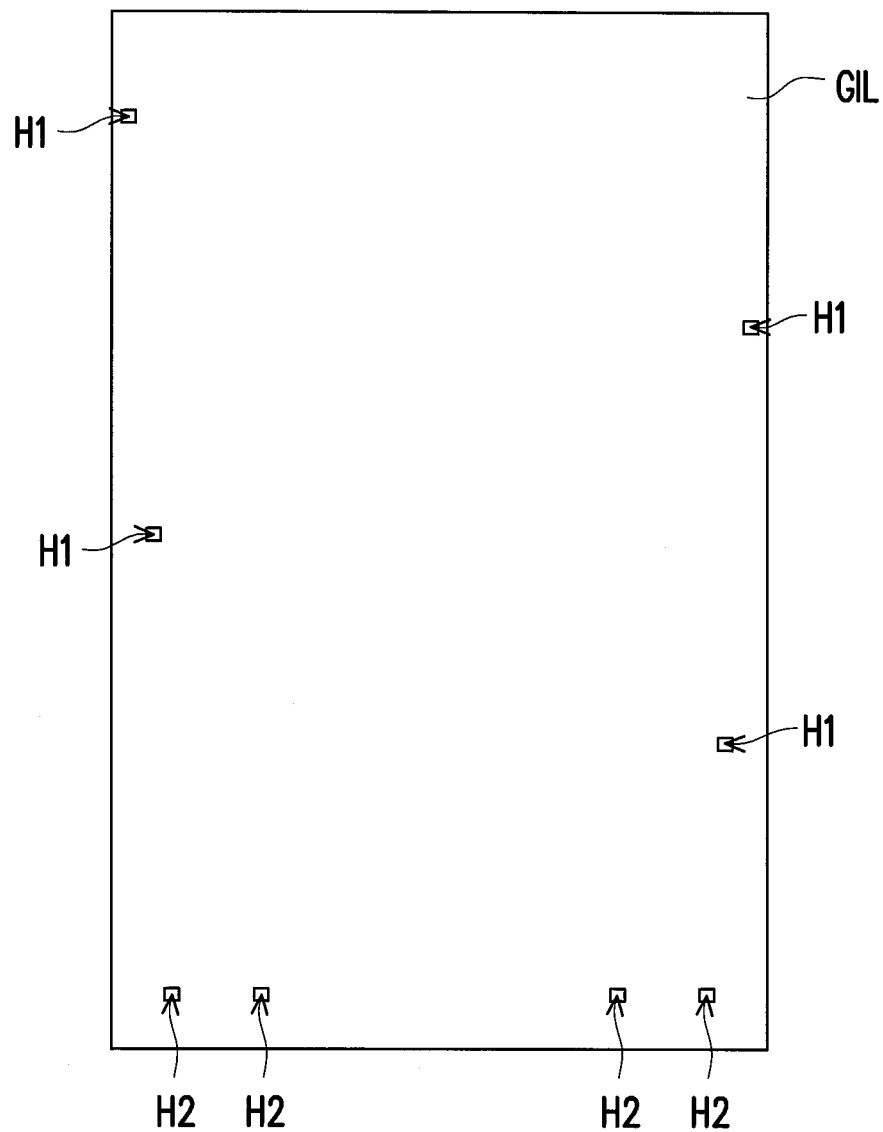

FIG. 5A to FIG. 5F are top views of film layers in the touch panel 100 depicted in FIG. 1, and the pattern of each film layer is clearly shown in these figures. Note that the film layers shown in FIG. 5A to FIG. 5F are sequentially stacked on the substrate in a bottom-to-top manner. With reference to FIG. 5A, the second conductive lines L2 are located in the same film layer. With reference to FIG. 5B, the insulation layer GIL is placed on the entire substrate 110. As shown in FIG. 5A and FIG. 5B, the first contact windows H1 of the insulation layer GIL respectively expose parts of the second conductive lines L2 in the active region AA, and the second contact windows H2 of the insulation layer GIL respectively expose parts of the second conductive lines L2 in the peripheral circuit region BB. In the present embodiment, the insulation layer GIL may be made of a transparent insulation material.

Figure 5C:
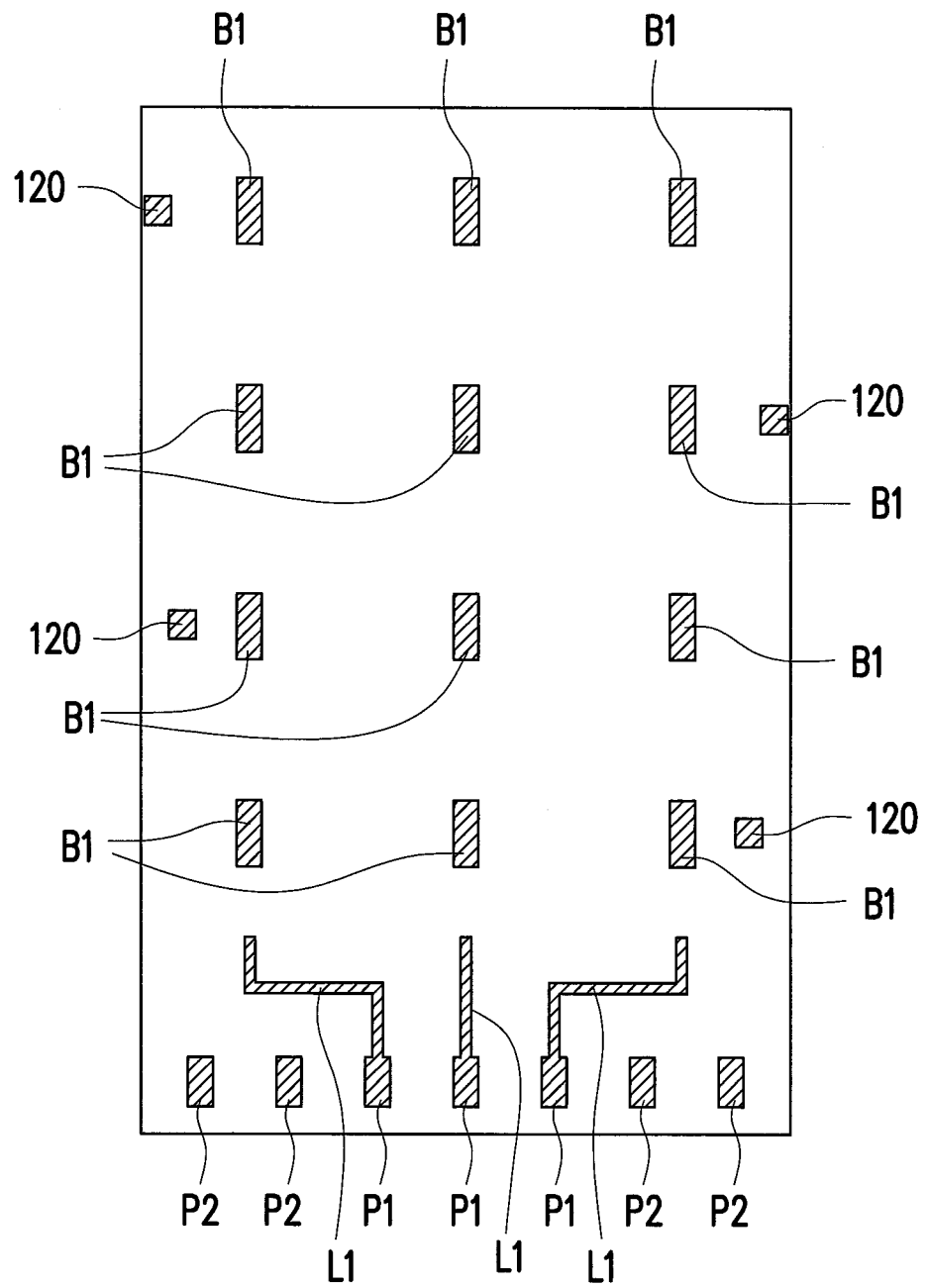
Figure 5D:
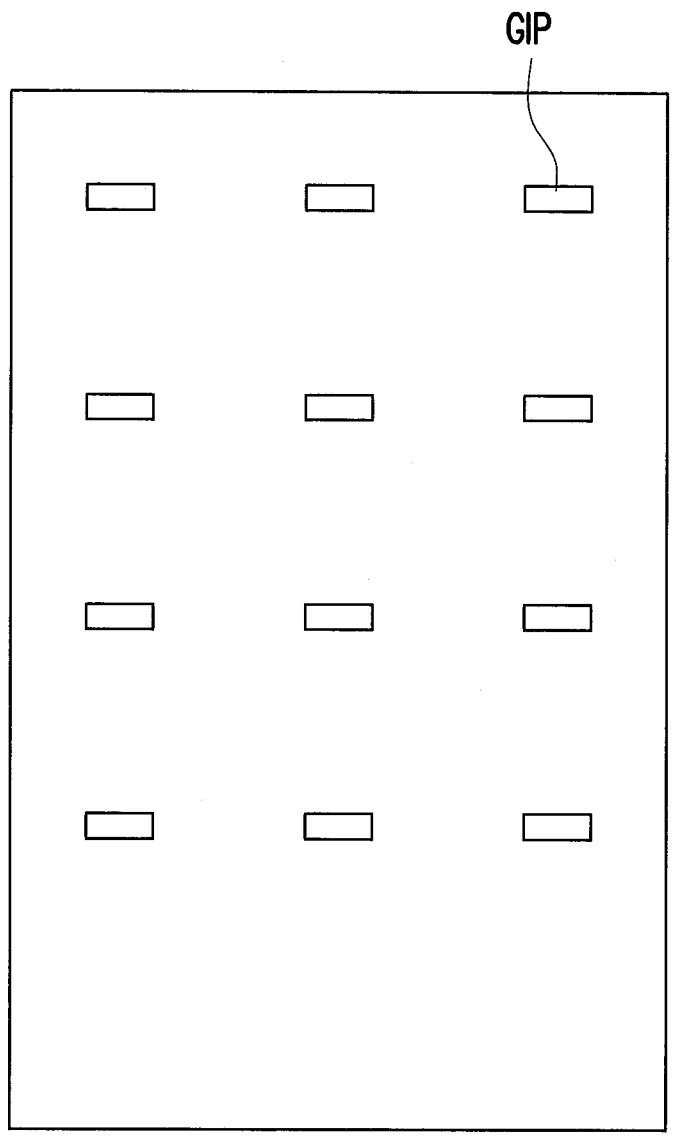

As shown in FIG. 5C, the bridge patterns B1 of the first sensing series S1, the conductive patterns 120, the first conductive lines L1, the first bonding pads P1, and the second bonding pads P2 may be located in the same film layer. The bridge patterns B1 of the first sensing series S1, the conductive patterns 120, the first conductive lines L1, the first bonding pads P1, and the second bonding pads P2 may be made of an opaque conductive material, e.g., metal, which should however not be construed as a limitation to the invention. In FIG. 5D, the touch panel 100 described in the present embodiment further includes a plurality of insulation patterns GIP. As shown in FIG. 1, the insulation patterns GIP are located between the intersections of the first sensing series S1 and the second sensing series S2. The insulation patterns GIP cover the bridge patterns B1 of the first sensing series S1. The second sensing series S2 cross the insulation patterns GIP and are not electrically connected to the first sensing series S1.

Figure 5E:
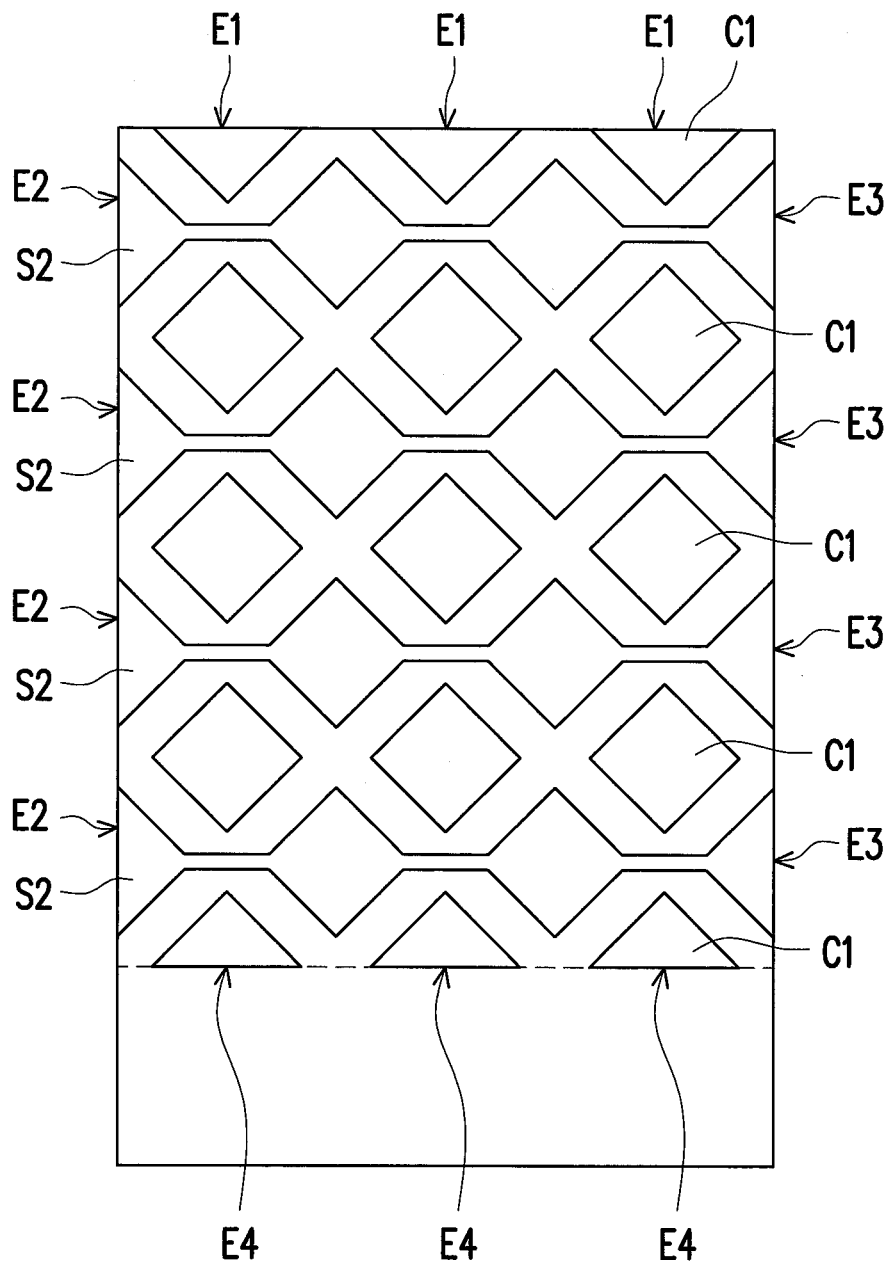

With reference to FIG. 5E, in the present embodiment, the first sensing pads C1 of the first sensing series S1 and the second sensing series S2 may be in the same film layer. The first sensing pads C1 of the first sensing series S1 and the second sensing series S2 may be made of a transparent conductive material, e.g., ITO. Note that the configuration relations and the shape of the first sensing series S1, the second sensing series S2, and the insulation patterns GIP are merely exemplary and should not be construed as limitations to the invention. As long as the second conductive lines L2 are employed to pull the input or output ends of the second sensing series S2 and the input or output ends of the first sensing series S1 to the same side, and the frame area of the touch panel is accordingly reduced, these modified embodiments are still within the scope of the invention for which protection is sought.

Figure 5F:
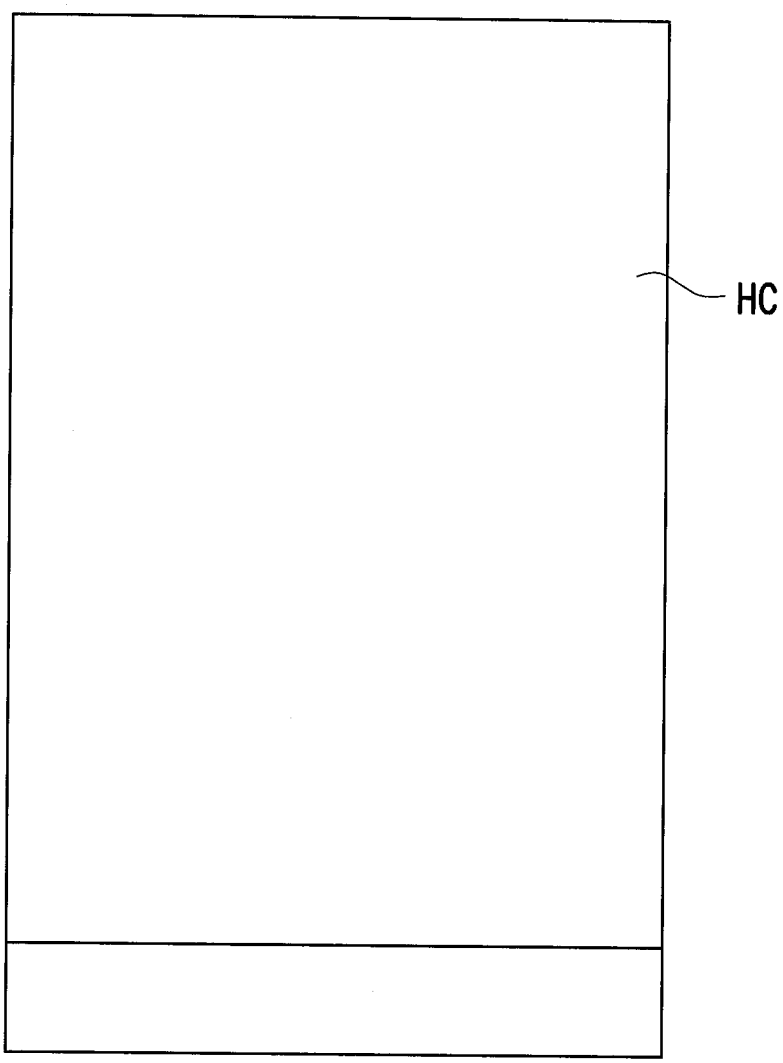

With reference to FIG. 5F, the touch panel 100 described in the present embodiment further includes a protection layer HC. As shown in FIG. 5A, FIG. 5C, FIG. 5D, FIG. 5D, FIG. 1, and FIG. 2, the protection layer HC may cover the first sensing series S1, the second sensing series S2, the first conductive lines L1, the second conductive lines L2, the insulation layer GIL, and the insulation patterns GIP; besides, the protection layer HC may expose the first bonding pads P1 and the second bonding pads P2.

Second Embodiment

Figure 6:
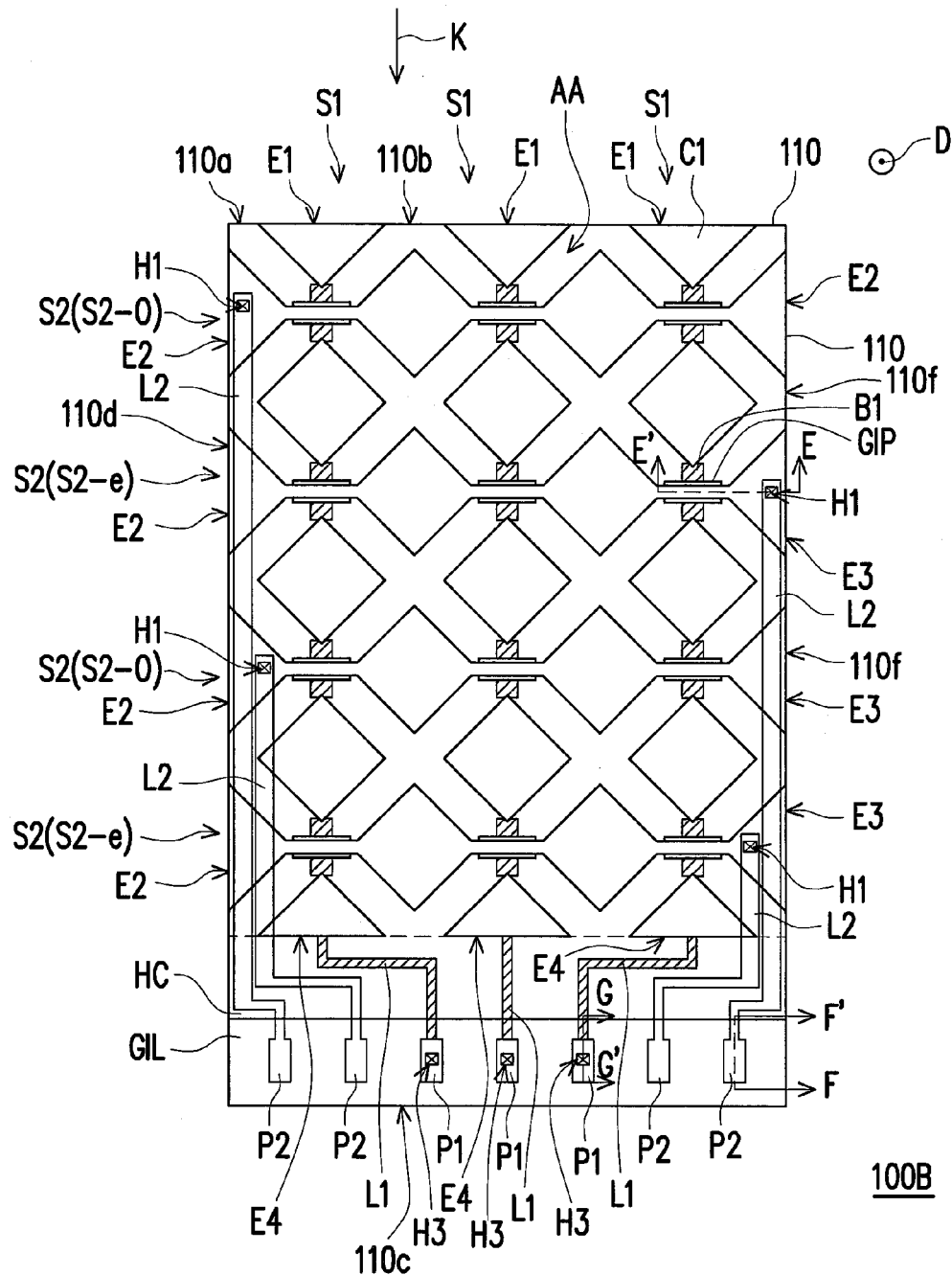
FIG. 6 is a schematic top view of a touch panel according to a second embodiment of the invention.
Figure 7:
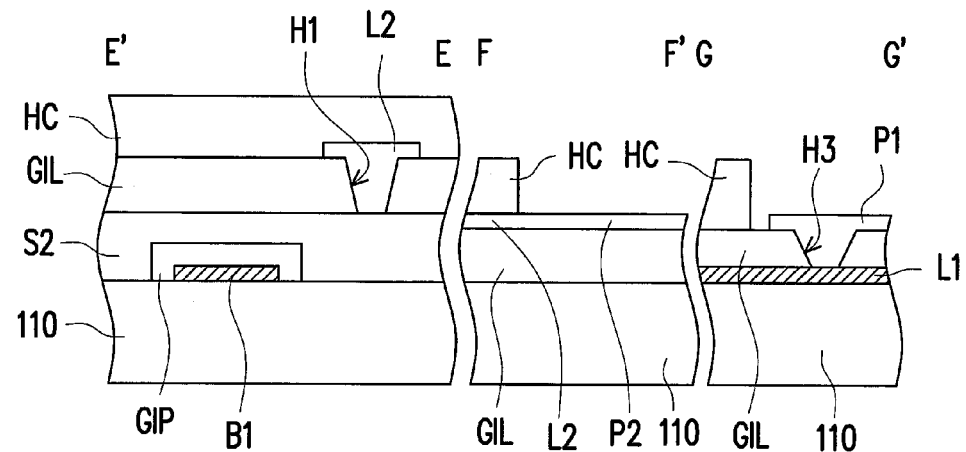
FIG. 7 is a schematic cross-sectional view illustrating the touch panel shown in FIG. 6 along sectional lines E-E', F-F' and G-G'.

FIG. 6 is a schematic top view of a touch panel according to a second embodiment of the invention. FIG. 7 is a schematic cross-sectional view illustrating the touch panel shown in FIG. 6 along sectional lines E-E', F-F' and G-G'. With reference to FIG. 6 and FIG. 7, the touch panel 100B described in the present embodiment is similar to the touch panel 100 described in the first embodiment, and therefore the same components are labeled by the same reference numbers. The difference therebetween lies in that the second conductive lines L2 of the touch panel 100 are located in the film layer below the first and second sensing series S1 and S2, and the second conductive lines L2 of the touch panel 100B are located in the film layer above the first and second sensing series S1 and S2. The difference will be explained below, while the similarities may be referred to the descriptions above and will not be further explained hereinafter.

With reference to FIG. 6 and FIG. 7, the touch panel 100B described in the present embodiment includes a substrate 110, a plurality of first sensing series S1, a plurality of second sensing series S2, a plurality of first conductive lines L1, and a plurality of second conductive lines L2. The substrate 110 has an active region AA and a peripheral circuit region BB located outside the active region AA. No conductive line electrically connected to the first sensing series S1 is configured between one end E1 of each of the first sensing series S1 and one portion 110b of an edge 110a of the substrate 110 adjacent to the end E1. The second sensing series S2 are located at the active region AA of the substrate 110 and interlaced with the first sensing series S1. No conductive line electrically connected to the second sensing series S2 is configured between any of the two opposite ends E2 and E3 of each of the second sensing series S2 and the other portion 110d (or 110f) of the edge 110a of the substrate 110 adjacent to the end E2 or the end E3. The two ends E2 and E3 refer to the two ends of each of the second sensing series S2 in an extension direction of the second sensing series S2.

The first conductive lines L1 are located at the peripheral circuit region BB of the substrate 110 and electrically connected to the first sensing series S1, respectively. The second conductive lines L2 are located on the substrate 110 and electrically connected to the second sensing series S2, respectively. The second conductive lines L2 are extended from the inside of the active region AA to the peripheral circuit region BB. Different from the first embodiment, the present embodiment as shown in FIG. 7 discloses that the insulation layer GIL is located between the second sensing series S2 and the second conductive lines L2, and the second sensing series S2 are located between the insulation layer GIL and the substrate 110. Namely, the second conductive lines L2 described herein are located in a film layer above the first sensing series S1 and the second sensing series S2.

Figure 8A:
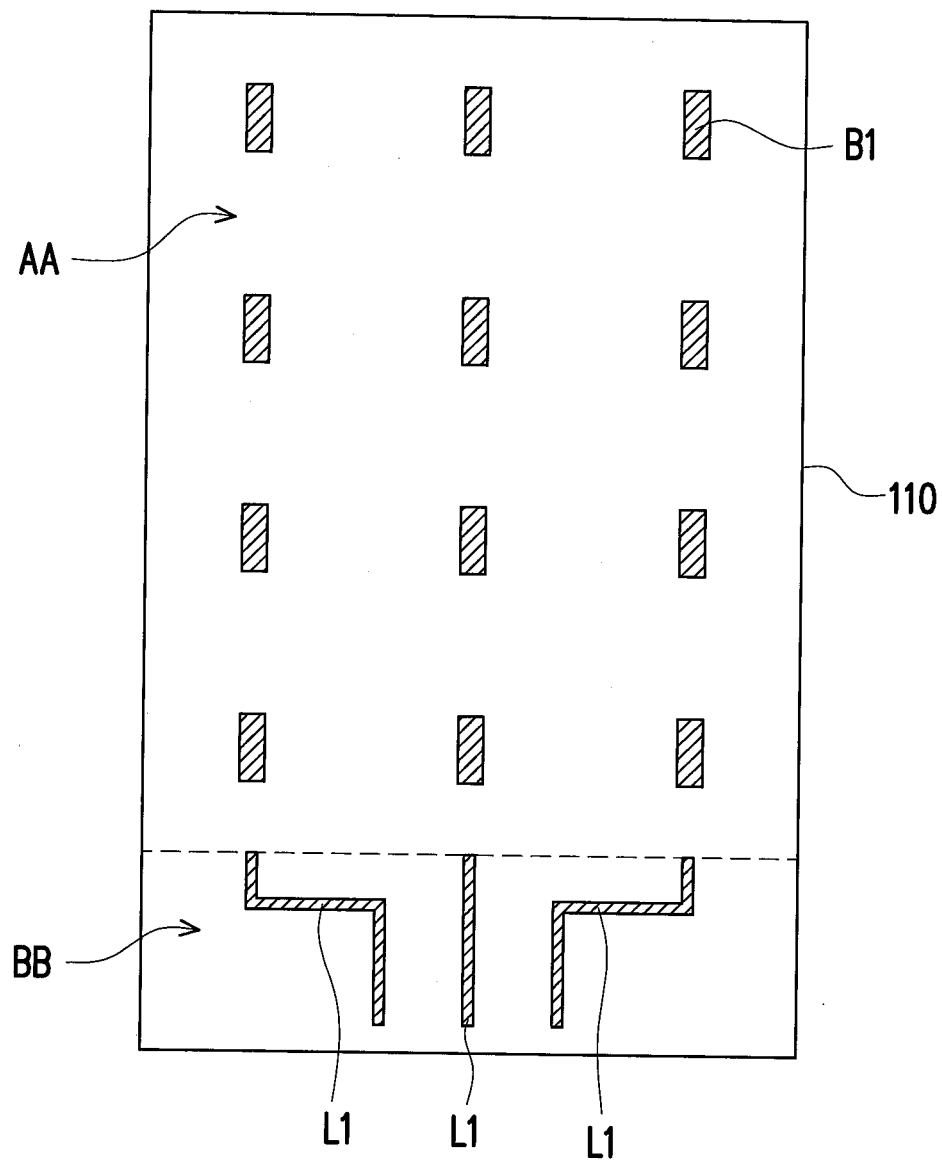
FIG. 8A to FIG. 8F are top views of film layers in the touch panel depicted in FIG. 6.
Figure 8B:
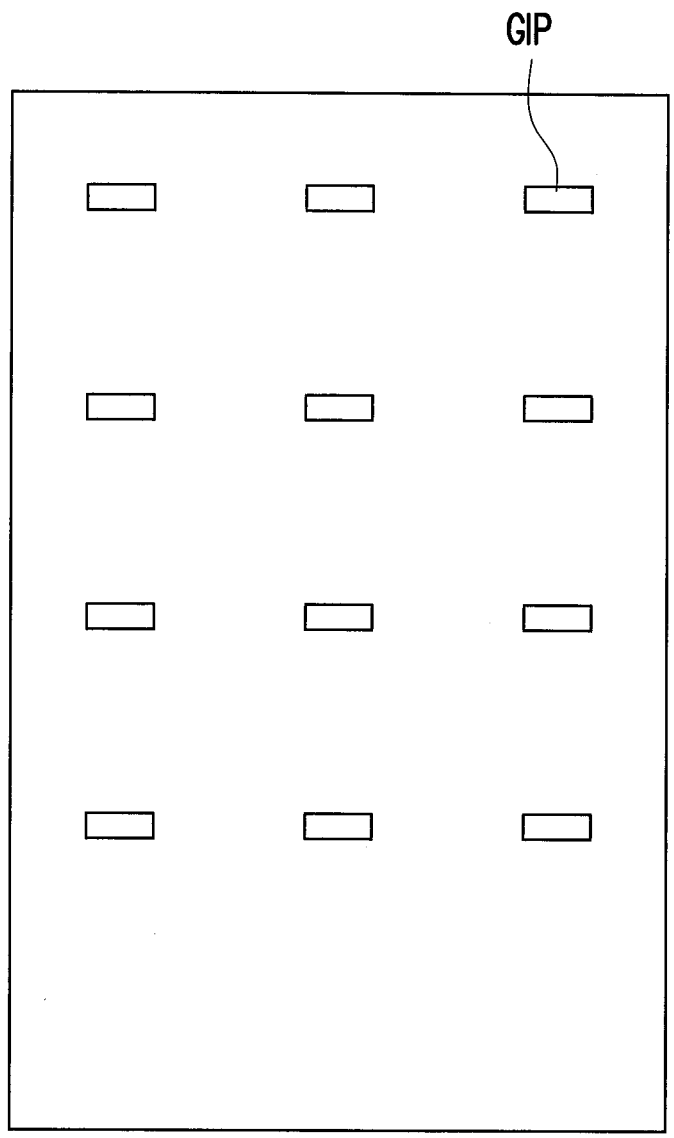
Figure 8C:
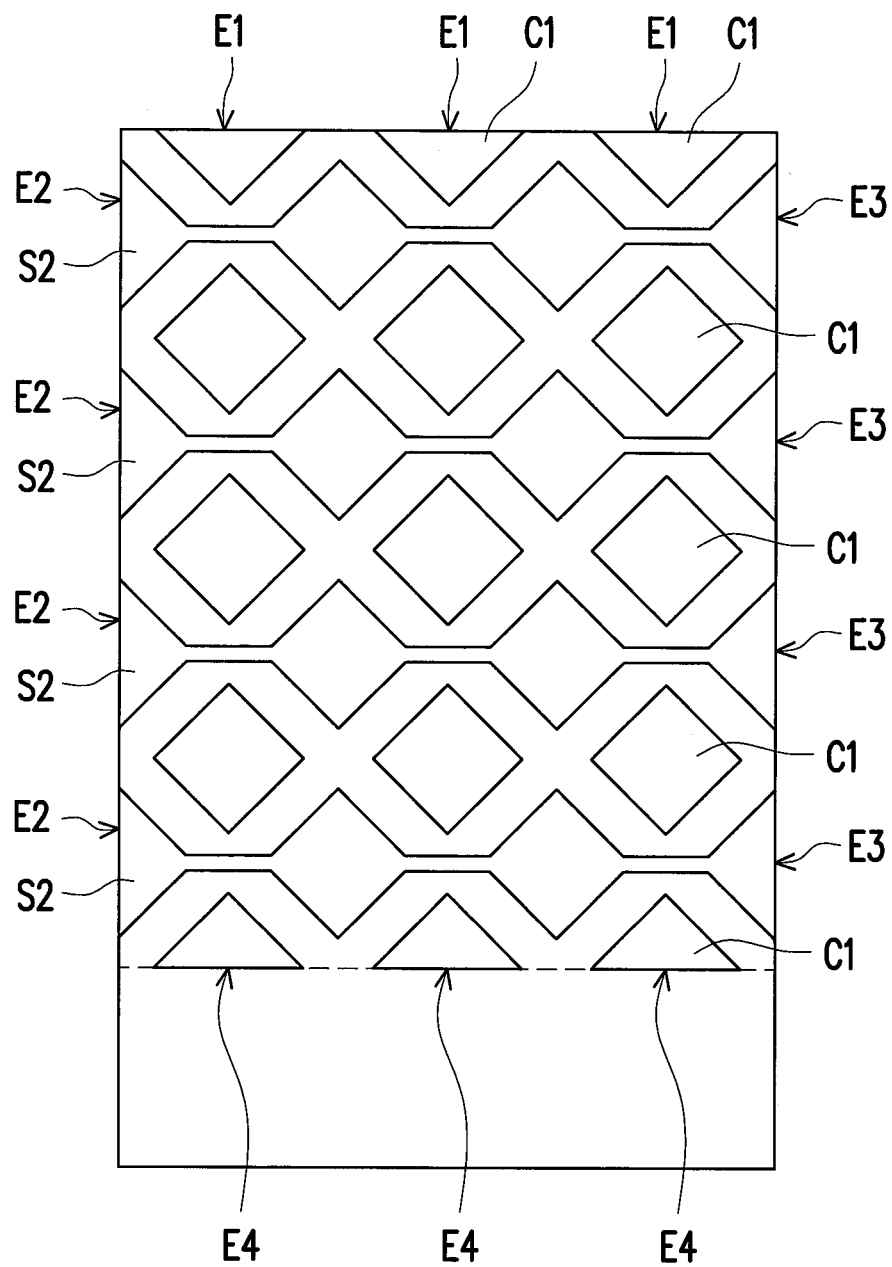
Figure 8D:
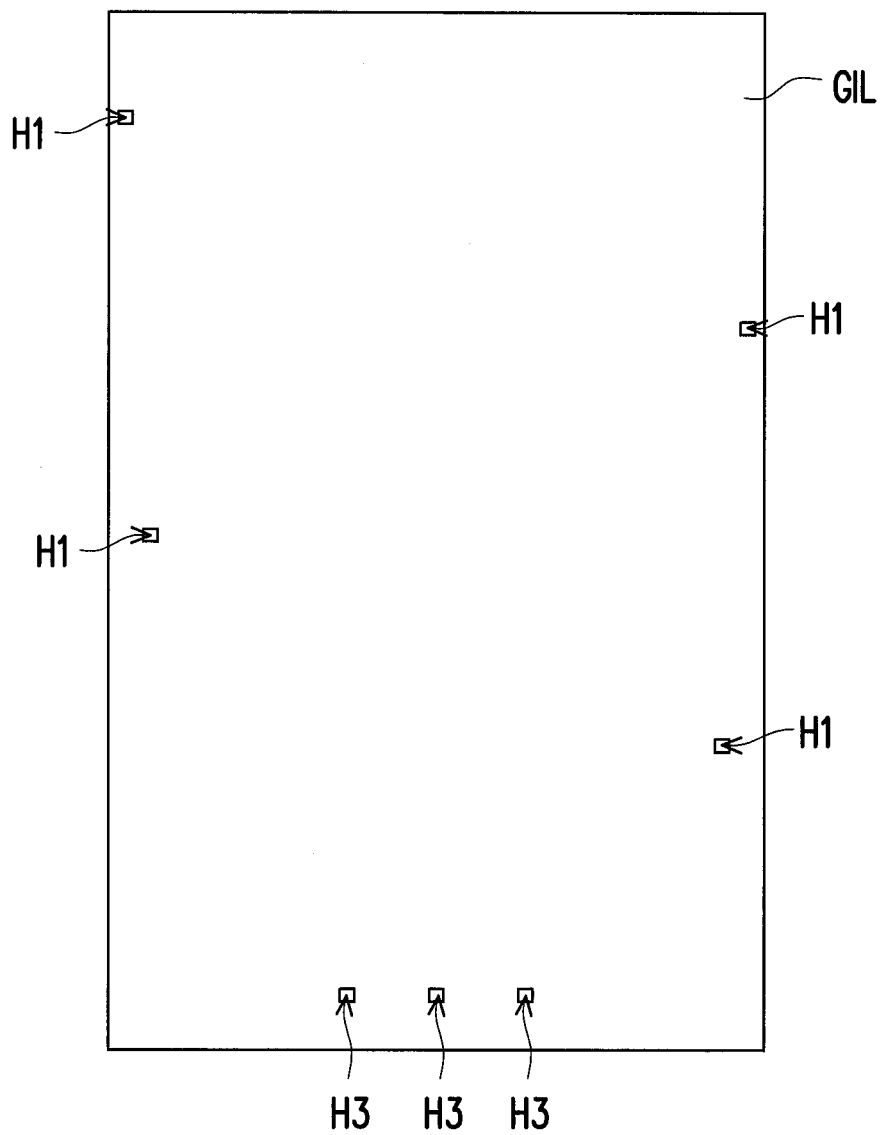
Figure 8E:
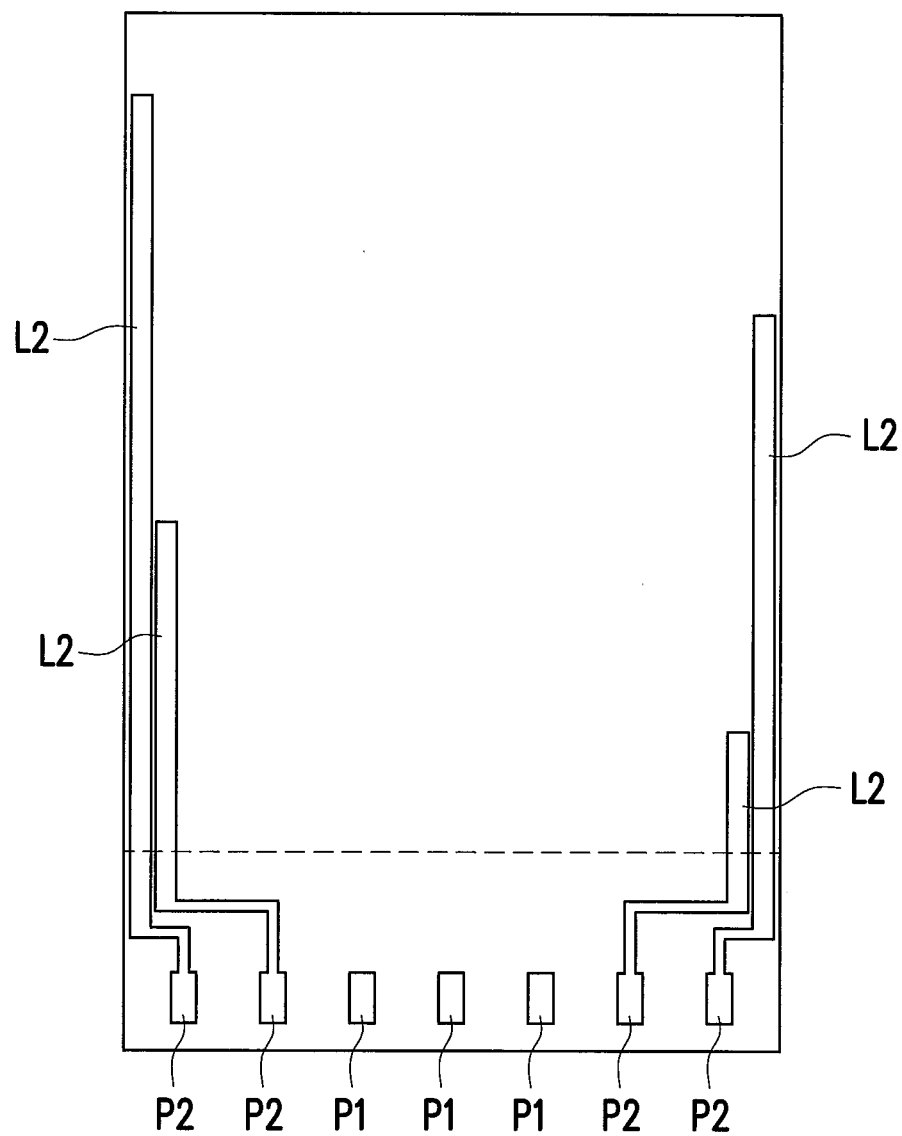

FIG. 8A to FIG. 8F are top views of film layers in the touch panel depicted in FIG. 6, and the pattern of each film layer is clearly shown in these figures. Note that the film layers shown in FIG. 8A to FIG. 8F are sequentially stacked on the substrate in a bottom-to-top manner (e.g., along a direction D). With reference to FIG. 8A, the first bridge patterns B1 and the first conductive lines L1 of the first sensing series S1 may be located at the same film layer. As shown in FIG. 8A, FIG. 8B, FIG. 8C, and FIG. 6, the insulation patterns GIP are located at the intersections of the first sensing series S1 and the second sensing series S2 and cover the bridge patterns B1 of the first sensing series S1. With reference to FIG. 8 C, the first sensing pads C1 of the first sensing series S1 and the second sensing series S2 may be in the same film layer. As shown in FIG. 8C, FIG. 8D, and FIG. 8E, the insulation layer GIL is located among the first sensing pads C1 of the first sensing series S1, the second sensing series S2, and the second conductive lines L2.

Figure 8F:
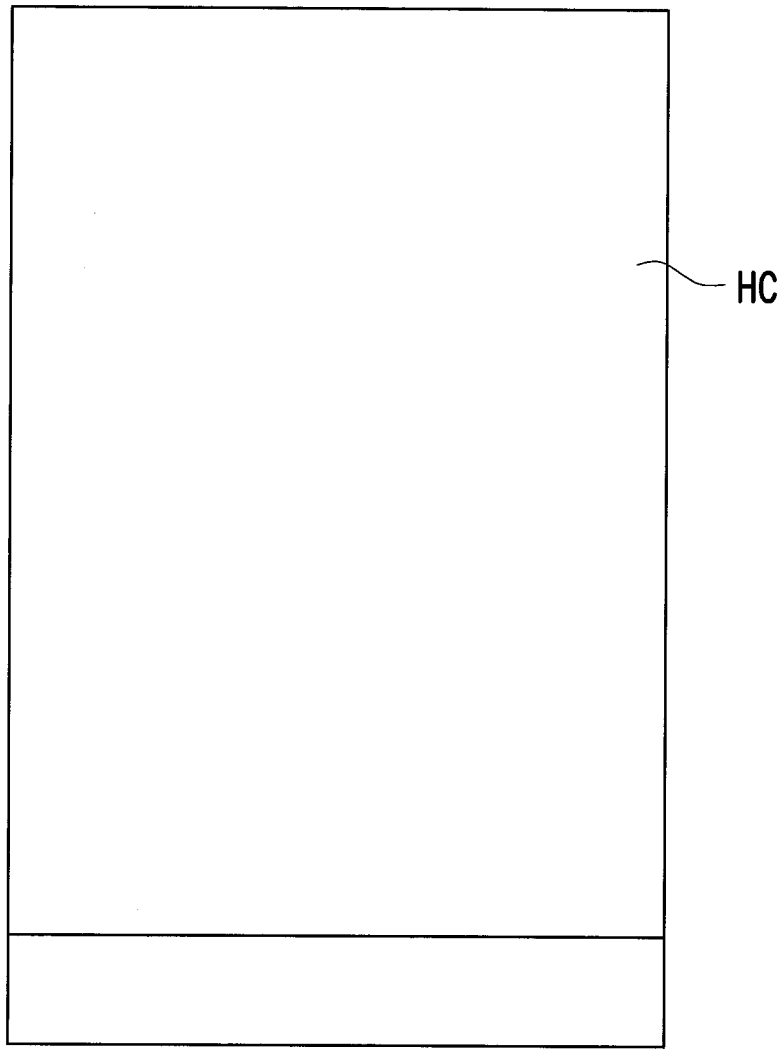

With reference to FIG. 8A and FIG. 8D, the insulation layer GIL has a plurality of first contact windows H1 and a plurality of third contact windows H3. The third contact windows H3 expose the first conductive lines L1. With reference to FIG. 8E, the second conductive lines L2, the second bonding pads P2, and the first bonding pads P1 may be located at the same film layer. As shown in FIG. 8C, FIG. 8D, FIG. 8E, FIG. 6, and FIG. 7, the first conductive windows H1 are filled with the second conductive lines L2, and thus the second conductive lines L2 are respectively in contact with and electrically connected to the second sensing series S2. The third contact windows H3 are filled with the first bonding pads P1, and the first bonding pads P1 are thus in contact with and electrically connected to the first conductive lines L1. With reference to FIG. 8F, FIG. 6, and FIG. 7, the touch panel 100B described in the present embodiment further includes a protection layer HC. The protection layer HC may cover the first sensing series S1, the second sensing series S2, the first conductive lines L1, the second conductive lines L2, the insulation layer GIL, and the insulation patterns GIP; besides, the protection layer HC may expose the first bonding pads P1 and the second bonding pads P2. Note that the touch panel 100B described in the present embodiment has similar effects and advantages to those of the touch panel 100 described in the first embodiment.

To sum up, the second conductive lines are employed in the touch panel described in an embodiment of the invention to pull the input or output ends of the second sensing series and the input or output ends of the first sensing series to the same side, so as to reduce the frame area of the touch panel.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:
1. A touch panel comprising:
a substrate having a surface divided into an active region and a peripheral circuit region located outside the active region;
a plurality of first sensing series located at the active region of the substrate, wherein no conductive line electrically connected to the first sensing series is configured between one end of each of the first sensing series and one portion of an edge of the substrate adjacent to the one end;
a plurality of second sensing series located at the active region of the substrate and interlaced with the first sensing series, wherein each of the second sensing series has two opposite ends, and no conductive line electrically connected to the second sensing series is configured between any of the two ends of each of the second sensing series and the other portion of the edge of the substrate adjacent to the any of the two ends;
a plurality of first conductive lines located at the peripheral circuit region of the substrate and electrically connected to the first sensing series, respectively; and
a plurality of second conductive lines located on the substrate and electrically connected to the second sensing series, respectively, wherein the second conductive lines are extended from an inside of the active region to the peripheral circuit region, and at least parts of the second conductive lines and parts of the second sensing series are overlapped in a direction perpendicular to the substrate.

2. The touch panel as recited in claim 1, further comprising an insulation layer located between the second sensing series and the second conductive lines, wherein the insulation layer has a plurality of first contact windows, and the second sensing series are electrically connected to the second conductive lines through the first contact windows.

3. The touch panel as recited in claim 2, wherein the second conductive lines are located between the insulation layer and the substrate.

4. The touch panel as recited in claim 2, wherein the second sensing series are located between the insulation layer and the substrate.

5. The touch panel as recited in claim 2, further comprising a plurality of conductive patterns, wherein the first conductive windows of the insulation layer are filled with the conductive patterns, the conductive patterns are electrically connected to the second conductive lines, and the second sensing series respectively cover the conductive patterns and are electrically connected to the second conductive lines.

6. The touch panel as recited in claim 5, wherein each of the first sensing series comprises a plurality of first sensing pads and a plurality of first bridge patterns serially connected to the first sensing pads, and the conductive patterns and the first bridge patterns are located at one film layer.

7. The touch panel as recited in claim 2, wherein the first contact windows of the insulation layer are respectively filled with the second sensing series, and the second sensing series are electrically connected to the second conductive lines.

8. The touch panel as recited in claim 1, further comprising a plurality of first bonding pads and a plurality of second bonding pads, wherein the first bonding pads are located at the peripheral circuit region of the substrate and electrically connected to the first conductive lines, respectively, the second bonding pads are located at the peripheral circuit region of the substrate and electrically connected to the second conductive lines, respectively, and the first bonding pads and the second bonding pads are located at one film layer.

9. The touch panel as recited in claim 8, further comprising an insulation layer located between the second bonding pads and the second conductive lines, wherein the insulation layer has a plurality of second contact windows respectively exposing the second conductive lines, the second contact windows are filled with the second bonding pads, and the second bonding pads are electrically connected to the second conductive lines.

10. The touch panel as recited in claim 1, wherein the second conductive lines are divided into two groups of the second conductive lines, one of the two groups of the second conductive lines is concentrated at one side of the substrate, and the other group of the second conductive lines is concentrated at the other side of the substrate opposite to the one side of the substrate.

11. The touch panel as recited in claim 10, wherein the second sensing series are arranged along a direction from the active region to the peripheral circuit region, the second sensing series located in odd rows are electrically connected to one of the two groups of the second conductive lines, and the second sensing series located in even rows are electrically connected to the other group of the second conductive lines.

12. The touch panel as recited in claim 1, wherein a thickness of the insulation layer is less than or substantially equal to 1.5 μm.

13. The touch panel as recited in claim 1, wherein the second conductive lines are transparent.

14. The touch panel as recited in claim 1, wherein a substrate has a first side, a second side opposite to the first side, a third side and a forth side opposite to the third side, wherein the one ends of the first sensing series are aligned to the first side of the substrate, the two ends of the second sending series are respectively aligned to the third side and the forth side of the substrate.

15. The touch panel as recited in claim 1, wherein the active region and the peripheral circuit region of the substrate are located on a same horizontal plane.

* * * * *